United States Patent
Van De Moortele

(10) Patent No.: US 7,892,419 B2
(45) Date of Patent: Feb. 22, 2011

(54) DEVICE AND METHOD FOR TREATING WATER

(75) Inventor: Guido Van De Moortele, Antwerp (BE)

(73) Assignee: Delta Water Engineering Limited, Limerick (IE)

( * ) Notice: Subject to any disclaimer, the term of this patent is extended or adjusted under 35 U.S.C. 154(b) by 921 days.

(21) Appl. No.: 11/793,269

(22) PCT Filed: Dec. 15, 2005

(86) PCT No.: PCT/BE2005/000184

§ 371 (c)(1),
(2), (4) Date: Jun. 15, 2007

(87) PCT Pub. No.: WO2006/066365

PCT Pub. Date: Jun. 29, 2006

(65) Prior Publication Data

US 2008/0087338 A1    Apr. 17, 2008

(30) Foreign Application Priority Data

Dec. 20, 2004   (BE) .................................. 2004/0627

(51) Int. Cl.
*B01J 47/14*    (2006.01)
(52) U.S. Cl. ........................... 210/88; 210/98; 210/136; 210/141; 210/142; 210/190; 210/191; 137/624.14; 137/624.18

(58) Field of Classification Search .................... 210/88, 210/98, 141, 142, 275, 662, 670, 687, 277, 210/278, 424, 425, 418, 192, 106, 108, 678, 210/792, 793; 137/624.14, 624.18
See application file for complete search history.

(56) References Cited

U.S. PATENT DOCUMENTS

| 4,275,448 A | 6/1981 | Le Dall |
| 4,568,465 A | 2/1986 | Davis et al. |
| 6,287,457 B1 | 9/2001 | Van De Moortele |

FOREIGN PATENT DOCUMENTS

| EP | 0 934 775 A1 | 8/1999 |
| EP | 1 160 204 A | 12/2001 |
| WO | WO 2004/022199 A1 | 3/2004 |

*Primary Examiner*—Duane Smith
*Assistant Examiner*—Paul J Durand
(74) *Attorney, Agent, or Firm*—Bacon & Thomas, PLLC

(57) ABSTRACT

Device for treating water with a supply (3); a treatment tank (4); a drain (9); a regulator (13); and a bypass (22) which connects the supply (3) to the drain (9), characterised in that in the main canalisation (2), on either side of the regulator (13), is provided a shut-off valve (12, 14); in that the device (1) comprises a first shunt canalisation (18) which bridges the first shut-off valve (12) and the regulator (13) and comprises a second shunt canalisation (20) which bridges the regulator (13) and the second shut-off valve (14), whereby both shunt canalisations (18, 20) comprise a shut-off valve (19, 21), and whereby the shut-off valves (12, 14) are open on either side of the regulator (13) during the treatment phase, whereas the other shut-off valves (19, 21) are open during the rinse or regeneration phase.

13 Claims, 10 Drawing Sheets

DEVICE AND METHOD FOR TREATING WATER

The present invention concerns a device for treating water, in particular of the type which contains a treatment medium which is regularly rinsed or regenerated, such as for example water softeners, ion exchangers or the like.

It is known that such a device for treating water contains a regulator which makes it possible to regularly rinse or regenerate the treatment medium.

Such a known device comprises a main canalisation which mainly consists of a supply for water to be treated; a treatment tank which is provided with a treatment medium; a pipe which connects the supply to the inlet of the treatment tank and which is provided with a valve which makes it possible to open or close this pipe; a drain; and a pipe which connects the outlet of the treatment tank to the above-mentioned drain, which pipe is provided with a regulator which makes it possible to connect the above-mentioned and other valves.

Further, such a known device contains a bypass which connects the above-mentioned supply to the above-mentioned drain and a pipe which connects the inlet of the treatment tank to a sewage drain. The bypass as well as the pipe to the sewage drain are hereby provided with a valve which is controlled by the regulator.

In the known device, the above-mentioned regulator consists of a volumeter which drives two program disks, in particular one program disk for controlling a treatment phase during which water is treated, and one program disk for controlling a regeneration phase.

During the treatment phase, the water to be treated flows via the supply through the treatment tank and through the regulator to the drain, whereby the meter drives the program disk concerned and makes sure that the valve between the supply and the inlet of the treatment tank stays open, whereas the valves in the bypass and in the pipe to the sewage drain are kept in a closed position.

When the device switches to the regeneration phase, the position of the above-mentioned valves is reversed, whereby water flows through the bypass into the drain.

A small amount of water is hereby tapped off from the drain and sent counterflow through the volumeter and the treatment tank to the sewage drain, whereby the treatment medium is rinsed.

A disadvantage of this known device is that the volumeter is passed in two different directions, as a result of which at least two different program disks need to be provided in the regulator, which makes the construction of this regulator considerably complex.

Thus, in many cases, such a regulator requires that at least one of the program disks is provided with resetting means which make it possible to reset the program disk concerned in its original position after the program concerned has been completed, before a new cycle is started.

Another disadvantage is that meters which must be able to measure in two opposite senses are less accurate than meters which are designed to constantly maintain the same sense of rotation.

The present invention aims to remedy the above-mentioned and other disadvantages.

To this end, the present invention concerns a device for treating water which comprises a main canalisation which mainly consists of a supply for the water to be treated; a treatment tank which is provided with a treatment medium; a pipe which connects the supply to the inlet of the treatment tank and which is provided with a valve; a drain; a pipe which connects the outlet of the treatment tank to the above-mentioned drain; and a regulator, whereby this device also comprises a bypass which is provided with a valve and which connects the above-mentioned supply to the drain, whereby a first shut-off valve and a second shut-off valve are provided in the main canalisation which are placed on either side of the regulator; whereby the device comprises a first shunt canalisation which bridges the above-mentioned first shut-off valve and the regulator, and a second shunt canalisation which bridges the above-mentioned regulator and the second shut-off valve; whereby the first shunt canalisation and the second shunt canalisation each comprise a shut-off valve, and whereby the first and second shut-off valve are open during a treatment phase and closed during the regeneration phase, whereas the other shut-off valves are open during a regeneration phase or rinse phase and closed during the treatment phase.

An advantage of such a device according to the invention is that the water constantly flows in the same sense through the regulator.

Another advantage of the present invention is that a relatively accurate regulator can be applied, as a result of which the quality of the treated water can always be optimal.

The present invention also concerns a method for treating water which mainly consists of a treatment phase and a rinse or regeneration phase, whereby the water is sent through a treatment tank and a regulator, and whereby, during the treatment phase as well as the rinse or regeneration phase, the water flows through the regulator in the same sense.

Preferably, a fraction of the water which flows through the treatment tank is led through the regulator during the treatment phase, whereas another fraction is led through a shunt canalisation which bridges the above-mentioned regulator and which is provided with an adjustable shut-off valve.

An advantage of this method according to the invention is that the water volume which flows through the regulator during the treatment phase can be adjusted as a function of for example the hardness of the water to be treated, as a result of which the volume of water to be treated can be optimally adjusted in a fast and simple manner during the treatment phase.

In order to better explain the characteristics of the invention, the following preferred embodiments of a device according to the invention for treating water are described as an example only, with reference to the accompanying drawings, in which:

FIG. 1 schematically represents a device according to the invention during a water treatment phase;

FIG. 2 represents the same device as in FIG. 1, but during a regeneration phase;

FIGS. 3 and 4, 5 and 6 respectively, represent variants of FIG. 1, FIG. 2 respectively;

FIGS. 10 to 13 represent sections according to lines X-X, XI-XI; XII-XII and XIII-XIII in FIG. 9.

Figures 1, 2:
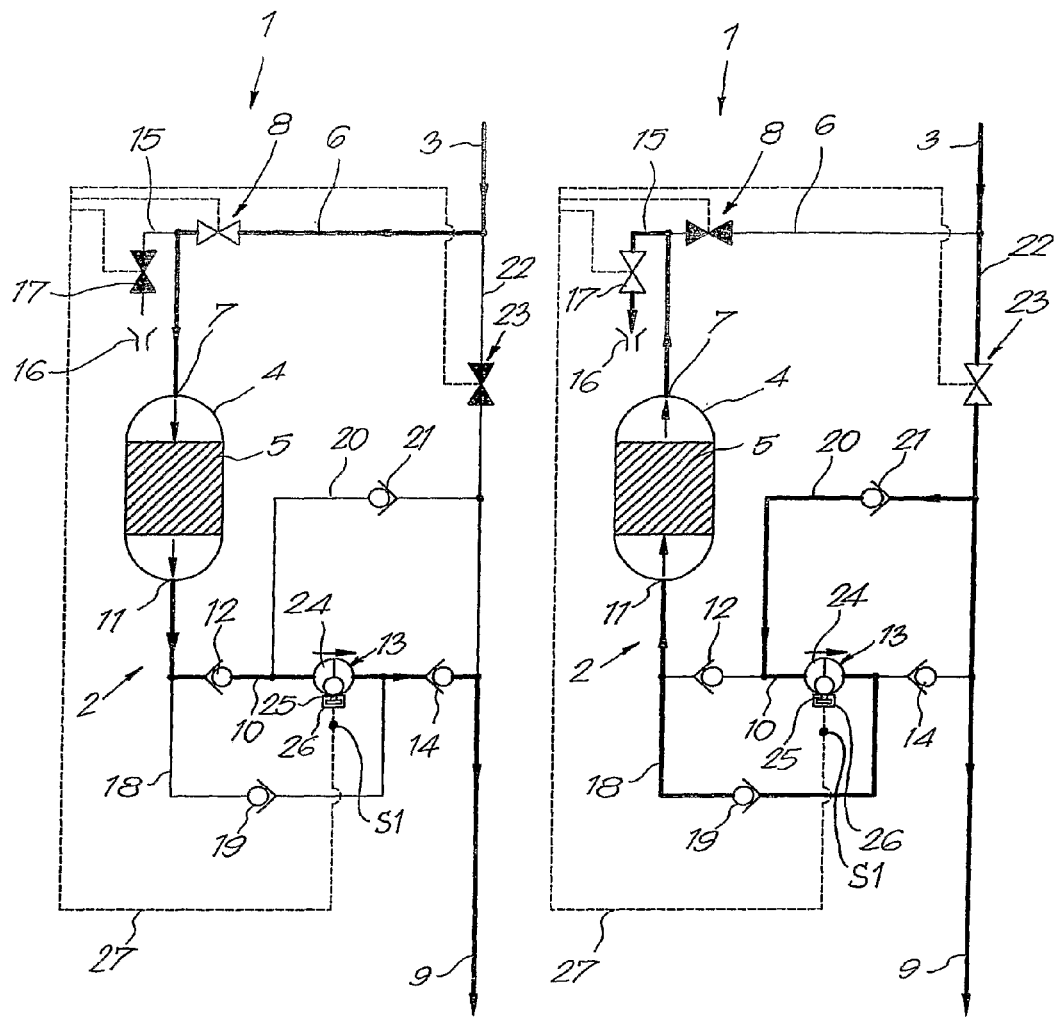

FIGS. 1 and 2 schematically represent a device 1 according to the invention which comprises a main canalisation 2 which mainly consists of a supply 3 for the water to be treated; a treatment tank 4 with a treatment medium 5; a pipe 6 which connects the supply 3 to an inlet 7 of the treatment tank 4 and which is provided with a valve 8; a drain 9; and a pipe 10 which connects the drain 9 to an outlet 11 of the treatment tank 4, and which is provided with a first shut-off valve 12, a regulator 13 and a second shut-off valve 14.

A pipe 15 connects the above-mentioned inlet 7 of the treatment tank 4 to a sewage drain 16 and is provided with a valve 17.

The above-mentioned first shut-off valve 12 and the regulator 13 are bridged by a shunt canalisation 18 which is connected to the above-mentioned pipe 10 with both far ends and which contains a shut-off valve 19.

A second shunt canalisation 20 bridges the above-mentioned regulator 13 and the second shut-off valve 14, whereby this shunt canalisation 20 is connected to the pipe 10 and to the drain 9 with its far ends.

In the latter shunt canalisation 20 is provided a shut-off valve 21.

A bypass 22 which is provided with a valve 23 connects the supply 3 to the drain 9.

The above-mentioned regulator 13 in this case mainly consists of a volumeter 24 which drives a program disk 26 by means of a transmission 25 which in turn, via servo valves SI and S2, works in conjunction with a control circuit 27 which is schematically represented by means of a dashed line and which makes it possible to control the above-mentioned valves 8, 17 and 23.

The control circuit 27 is hereby preferably hydraulic and consists of a network of pipes which can be either or not put under pressure, depending on the position of the above-mentioned program disk.

Also the above-mentioned shut-off valves 12, 14, 19 and 21 can be controlled by means of the regulator 13, whereby the shut-off valves 12 and 14 are in this case always situated in a position which is opposite to the position of the shut-off valves 19 and 21.

The working of the above-described device 1 according to the invention is simple and as follows.

In order to treat water, the valve 8 is opened by the above-mentioned control circuit 27, which is controlled by the above-mentioned program disk 26, in the regulator 13 and the servo valve SI working in conjunction with it, whereas the valves 17 and 23 are closed.

The shut-off valves 12 and 14 in the main canalisation 2 are hereby opened as well, whereas the shut-off valves 19 and 21 in the shunt canalisations 18 and 20 are closed.

In this position of the valves 8, 17 and 23, the water to be treated flows from the supply 3 through the pipe 6 and via the open valve 8 through the treatment tank 4, where the water to be treated comes into contact with the treatment medium 5.

From the outlet 11 of the treatment tank 4, the water flows through the shut-off valve 12, the regulator 13 and the shut-off valve 14 to the drain 9 which is connected, for example, to a user network.

As water flows through the regulator 13, the above-mentioned volumeter 24 is being driven, as a result of which the program disk 26 rotates. As soon as this program disk 26 reaches the regeneration position, the servo valve SI opens and changes the signal of the pressure in the control circuit 27, as a result of which the valve 8 is closed and the valves 17 and 23 are opened, while also the position of the shut-off valves 12, 14, 19 and 21 is reversed.

In this position of the different valves 8, 17 and 23, the untreated water flows from the supply 3 through the bypass 22 directly into the drain 9, whereby a part of the untreated water is tapped off via the second shunt canalisation 20 through the shut-off valve 21 and next via the regulator 13 and the first shunt canalisation 18, counterflow to the treatment tank 4, whereby the treatment medium is rinsed and after which the water is drained via the sewage drain 16.

According to the invention and as is clear from FIG. 2, during said regeneration or rinse phase, the water flows in the same flow direction through the regulator 13 as during the treatment phase.

As during this regeneration phase, the regulator 13 and thus the volumeter 24 is being flown through by the water in the same sense, the program disk 26 will keep on rotating in the same sense and finally, after the regeneration phase has been completed, it will reach the treatment phase again, after which the above-described cycle starts anew.

It should be noted that the different shut-off valves 12, 14, 19 and 21 are preferably non-return valves, whereby the non-return valves 12 and 14 allow for a flow direction towards the drain 9, whereas the non-return valves 19 and 21 allow for a flow direction opposite to that of the above-mentioned non-return valves 12 and 14.

The use of non-return valves 12, 14, 19 and 21 hereby offers the advantage that they must not be controlled by a control circuit, as a result of which the device 1 can be made somewhat simpler than in the case where no non-return valves are used.

Figures 3, 4:
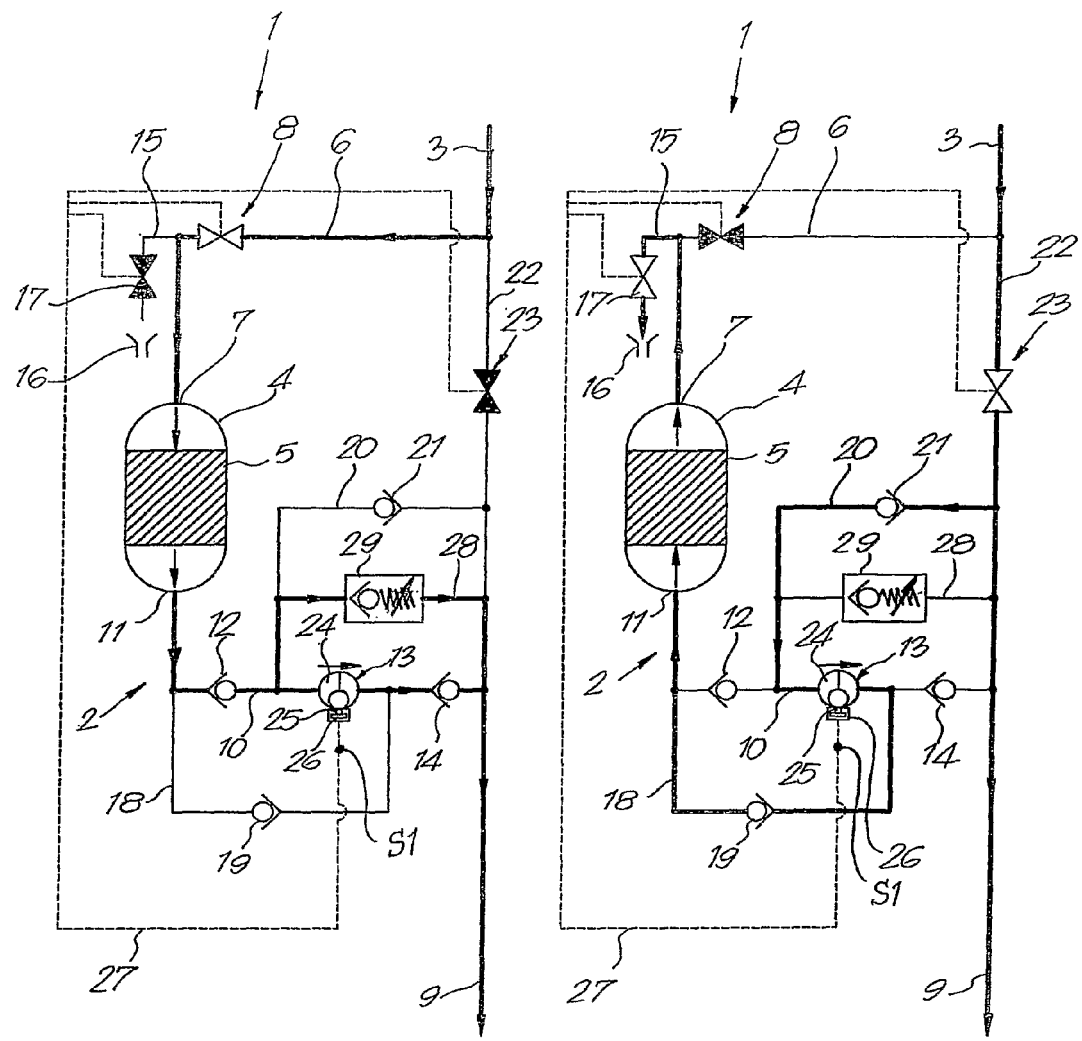

FIGS. 3 and 4 represent a variant of the device according to the invention in which a third shunt canalisation 28 is provided which bridges the above-mentioned regulator 13 and the shut-off valve 14 and which is connected to the pipe 10 and the drain 9 at its far ends.

In this third shunt canalisation 28 is, in this case, provided a shut-off valve 29 with an adjustable resistance which allows for a flow from the pipe 10 to the drain 9.

This variant makes it possible to lead, during the treatment phase, a fraction of the treated water around the regulator 13 towards the drain 9, whereby the volume of this fraction can be adjusted by setting the resistance of the above-mentioned shut-off valve 23 in the third shunt canalisation 28.

This diversion of a fraction of the treated water is advantageous in that the volume of water which flows through the treatment tank 4 during the treatment phase can be adjusted in a simple manner by reducing or increasing the resistance of the shut-off valve 29.

Indeed, if the resistance of the shut-off valve 29 is reduced, the fraction flowing through the regulator 13 will be smaller, as a result of which the program disk 26—for the same amount of water flowing through the treatment tank—will rotate less fast.

Thus, if the device is for example a filter, the fraction of the treated water which is diverted around the regulator 13 can be selected as a function of the purity of the untreated water, whereby, in case the water to be treated has many impurities, the diverted fraction is selected relatively small, whereas if the water to be treated is relatively pure, a large fraction can be diverted around the regulator 13, as the treatment medium 5 can filter a relatively large amount of water before becoming saturated in this case.

It should be noted that the above-mentioned third shunt canalisation 28 and the adjustable shut-off valve 29 provided therein can be integrated in the first shunt canalisation 18, by replacing the above-mentioned shut-off valve 19 in this first shunt canalisation 18 by a valve which allows for a flow in two directions and which can be at least set in the flow direction towards the drain 9.

Figure 5:
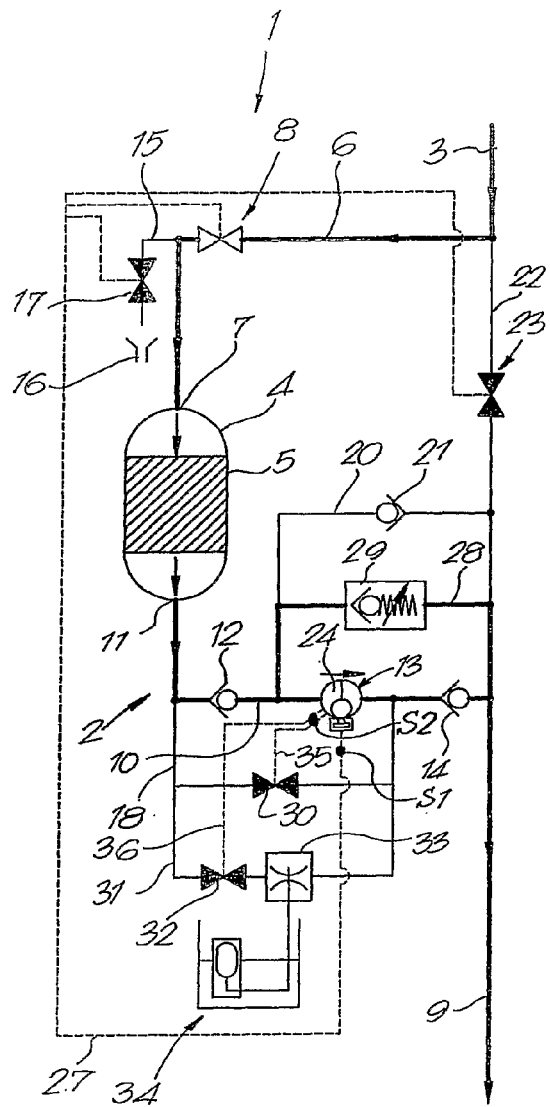
Figure 6:
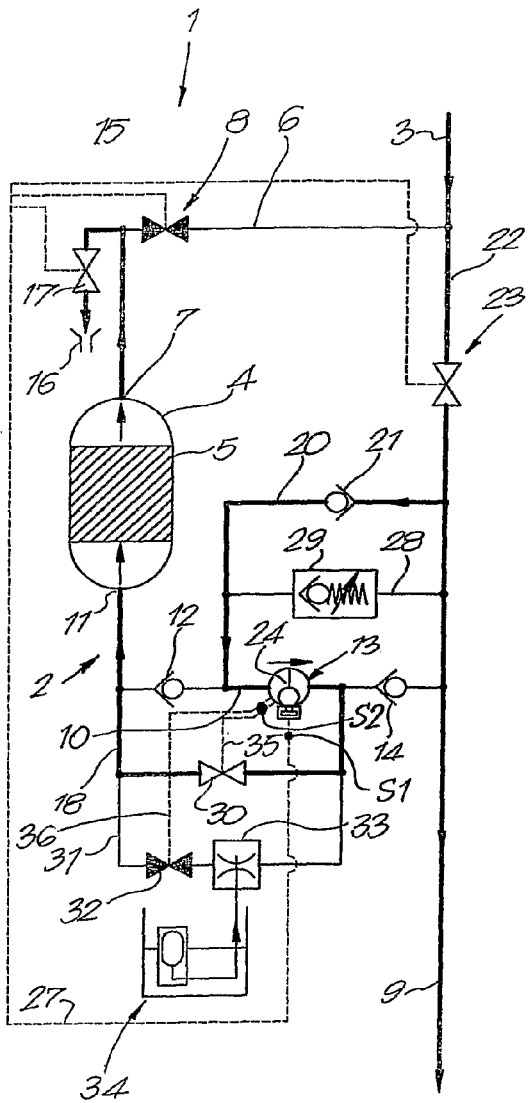
Figure 7:
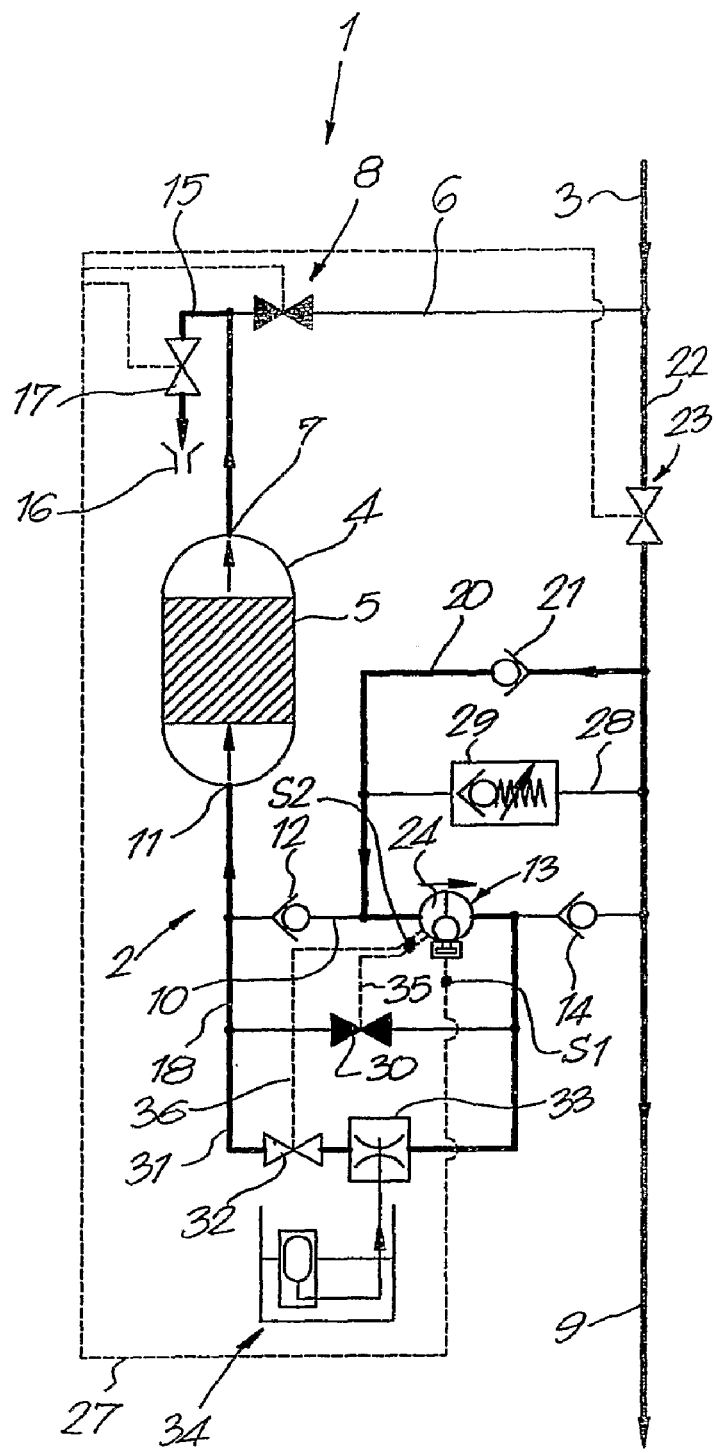
FIG. 7 represents the same variant as in FIGS. 5 and 6, but during another operational stage.
Figure 8:
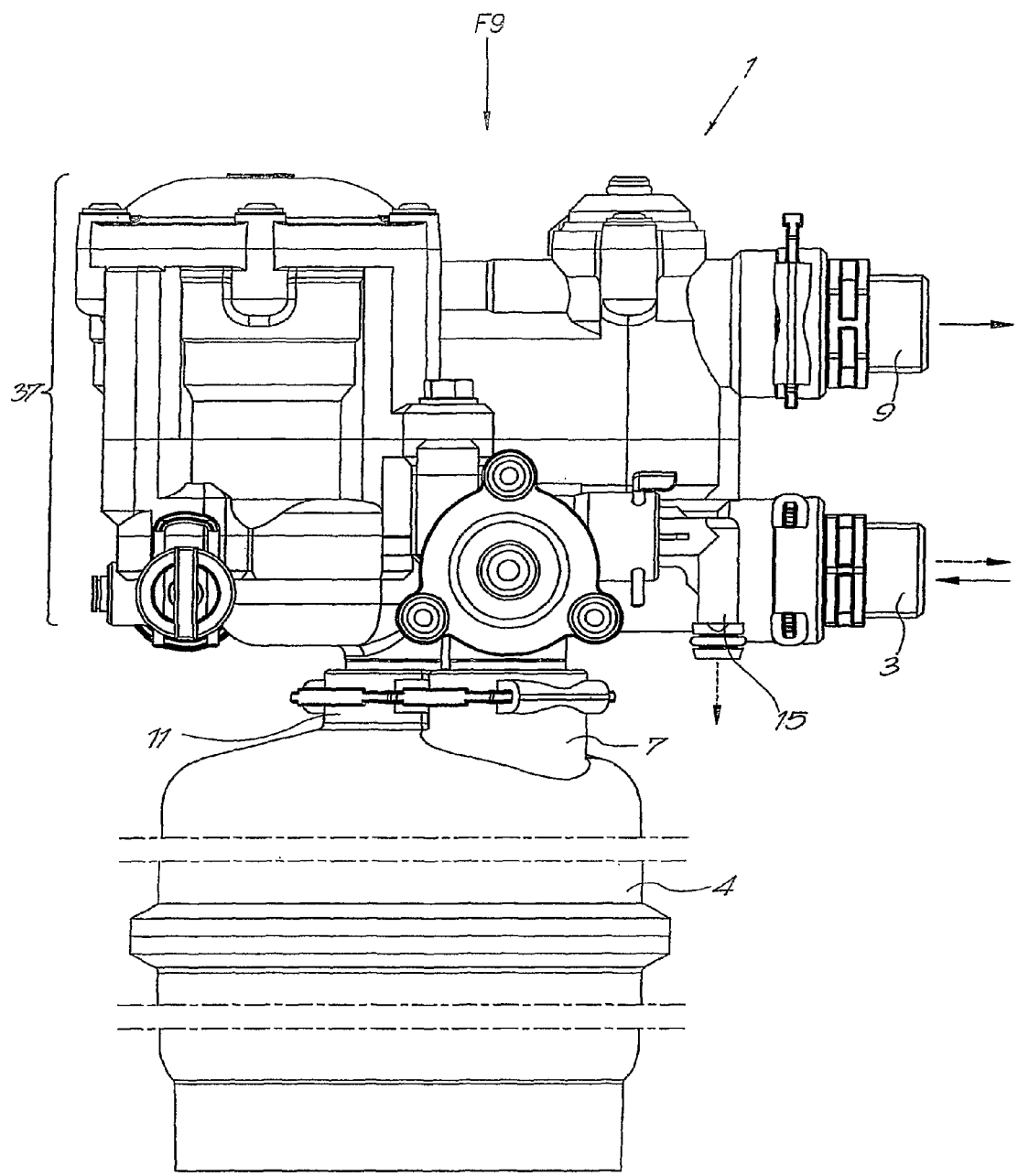
FIG. 8 is a practical embodiment of a device according to the invention.
Figure 9:
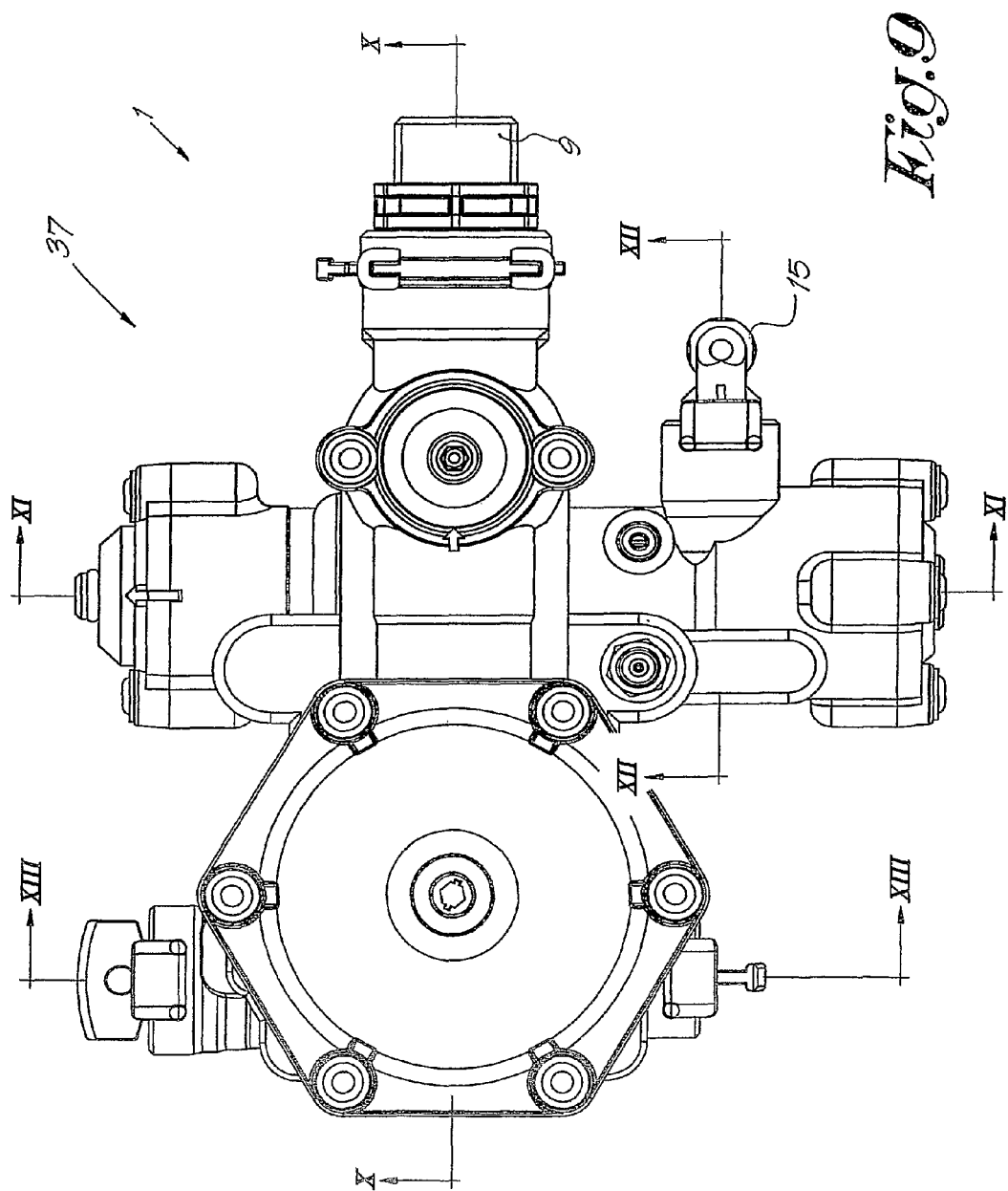
FIG. 9 represents a view according to arrow F9 in FIG. 8.

FIGS. 5 to 7 represent another variant of the device according to the invention, in which the above-mentioned shut-off valve 19 in the first shunt canalisation 18 is replaced by a valve 30 and in which this valve 30 is bridged by a brine pipe 31 which is connected to the above-mentioned first shunt canalisation 18 with its far ends and which is provided with a valve 32 and an ejector 33 which works in conjunction with a brine reservoir 34.

For each of the valves 30 and 32 concerned is preferably provided a control circuit 35, 36 which works in conjunction with the servo valves S1, S2 which are driven by the above-mentioned program disk 26 of the regulator 13.

During the treatment phase, the working of this variant is analogous to that of the variant represented in FIGS. 3 and 4.

The regeneration phase in this case preferably comprises the following steps: rinsing the treatment medium 5; regenerating the treatment medium 5 with a brine solution; and re-rinsing the treatment medium.

For the rinsing of the treatment medium 5, the above-mentioned control circuits 35 and 36 make sure that the valve 30 in the first shunt canalisation 18 is opened, whereas the valve 32 in the brine pipe 31 is kept closed.

In this position of the valves 30 and 32, the treatment medium 5 is rinsed counterflow and the above-mentioned program disk 26 is being driven.

When said program disk reaches the actual regeneration position, the signal or the pressure in the control circuits 35 and 36 changes, as a result of which the position of the valves 30 and 32 is reversed, and as a result of which the untreated water no longer flows through the first shunt canalisation 18 to the treatment tank 4, but via the brine pipe 31.

In the brine pipe 31, brine is sucked in the known manner from the brine reservoir 34 by means of the ejector 33, which brine is mixed with the untreated water and brought counterflow into contact with the treatment medium 5.

After the brine treatment program has been completed, the program disk 26 will cause the position of the valves 30 and 32 to reverse, as a result of which a counterflow rinsing of the treatment medium 5 is again obtained.

It should be noted that, in this variant, the third shunt canalisation 28 can be omitted when the above-mentioned valve 30 cannot only be flown through in one direction towards the treatment tank, but also in the counterflow direction towards the drain 9.

Further, it should be noted that the part of the shunt canalisation 31 between the ejector 33 and the main canalisation 2 between the regulator 13 and the second shut-off valve 14 can be formed of the control circuit 27.

It should also be noted that, in the above-described embodiment, the first shunt canalisation 18 can only bridge the shut-off valve 12, and not the regulator 13.

In that case, the volume which is used for the counterflow rinsing of the treatment tank 4 is not measured, such that a very accurate measurement of the water volume which is used for the brine treatment of the treatment tank 4 can be obtained.

FIGS. 8 to 13 represent a practical embodiment of a device according to the invention, whereby the device 1 consists of a main part 37 which can be fixed to the treatment tank 4 in a removable manner.

The main part 37 hereby consists of a housing 38 in which the above-mentioned pipes 6, 10, 15 and 31, the above-mentioned shunt canalisations 18, 20 and 28, and the bypass 22 are contained, as well as the shut-off valves provided therein, the valves and ejector 33, as well as the above-mentioned regulator 13.

Figure 10:
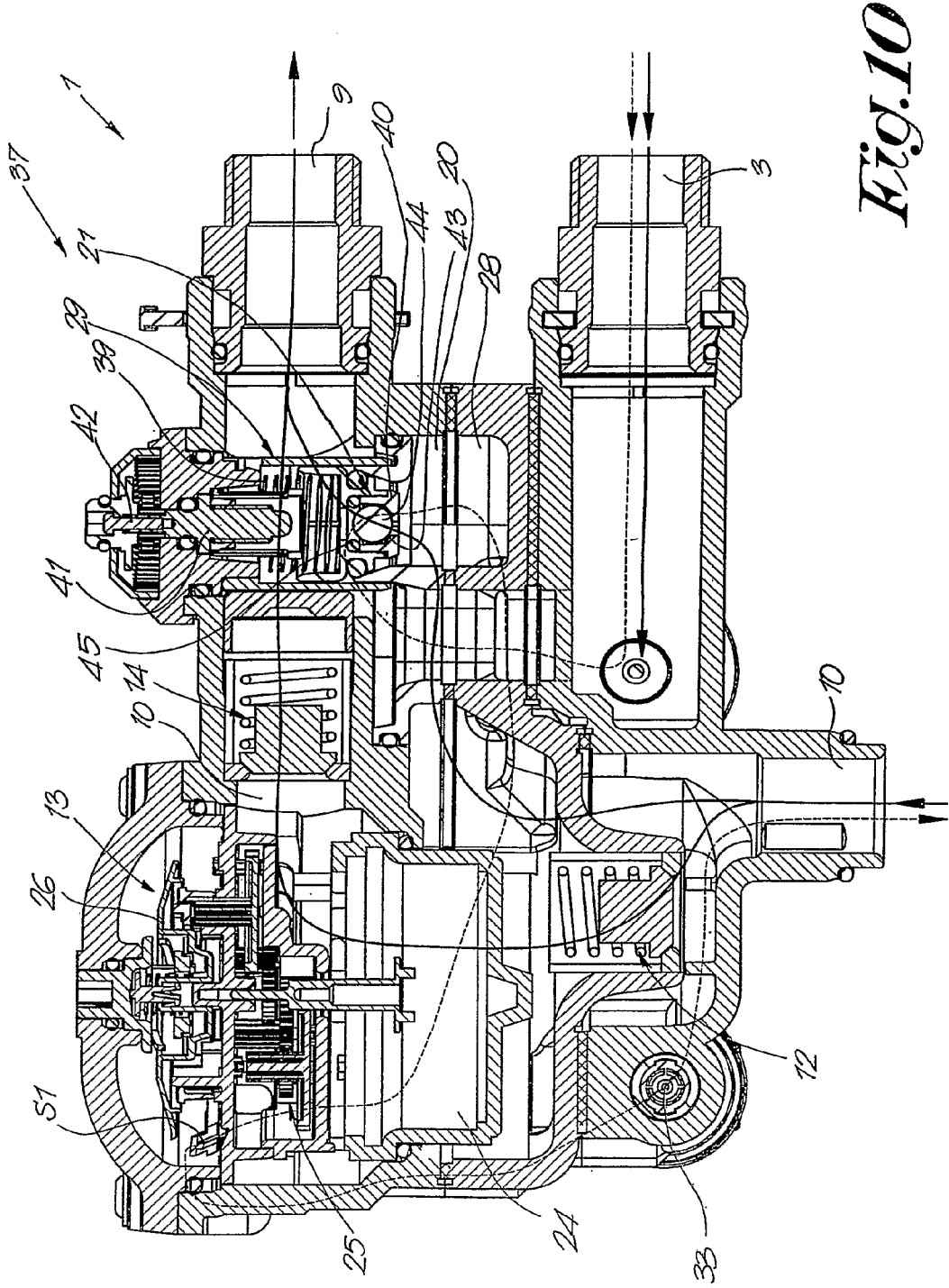

In FIG. 10, for clarity's sake, the flow directions during the treatment phase and the regeneration phase are indicated by means of a full line, a dashed line respectively.

In this practical embodiment, the above-mentioned shut-off valve 21 in the second shunt canalisation 20 and the shut-off valve 29 with adjustable resistance in the third shunt canalisation 28 are integrated in one another.

The above-mentioned shut-off valve 29 in the third shunt canalisation 28 is excited by means of a compression spring 39 which works in conjunction with the closing side 40 of this shut-off valve 29 with one far end, and which is fixed to a holder 41 with its other far end which, by means of an adjusting screw 42, can compress the spring 39 to a higher or lesser degree in the axial direction, so as to be able to adjust the resistance of the shut-off valve 29.

On the closing side 40 of this shut-off valve 29 is provided a cylindrical passage 43 in which is contained a ball 44 which can be axially moved in the passage 43, and which can work in conjunction with a sealing 45 on one far end of said passage 43 whereby the passage 43 is closed.

The above-mentioned passage 43, ball 44 and sealing 45 hereby assume the task of the above-mentioned shut-off valve 21 in the second shunt canalisation 20.

Figure 11:
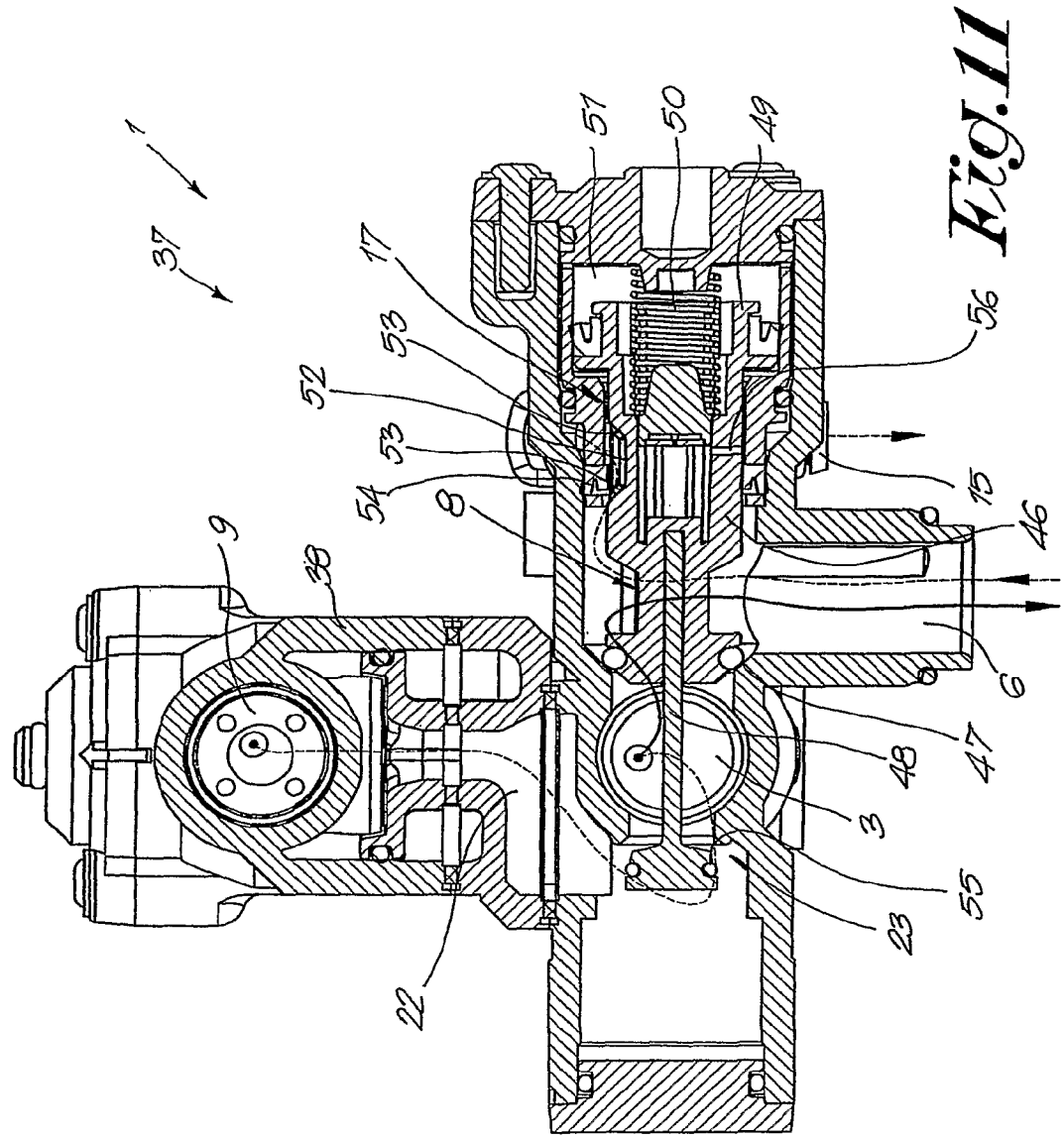
Figure 19:
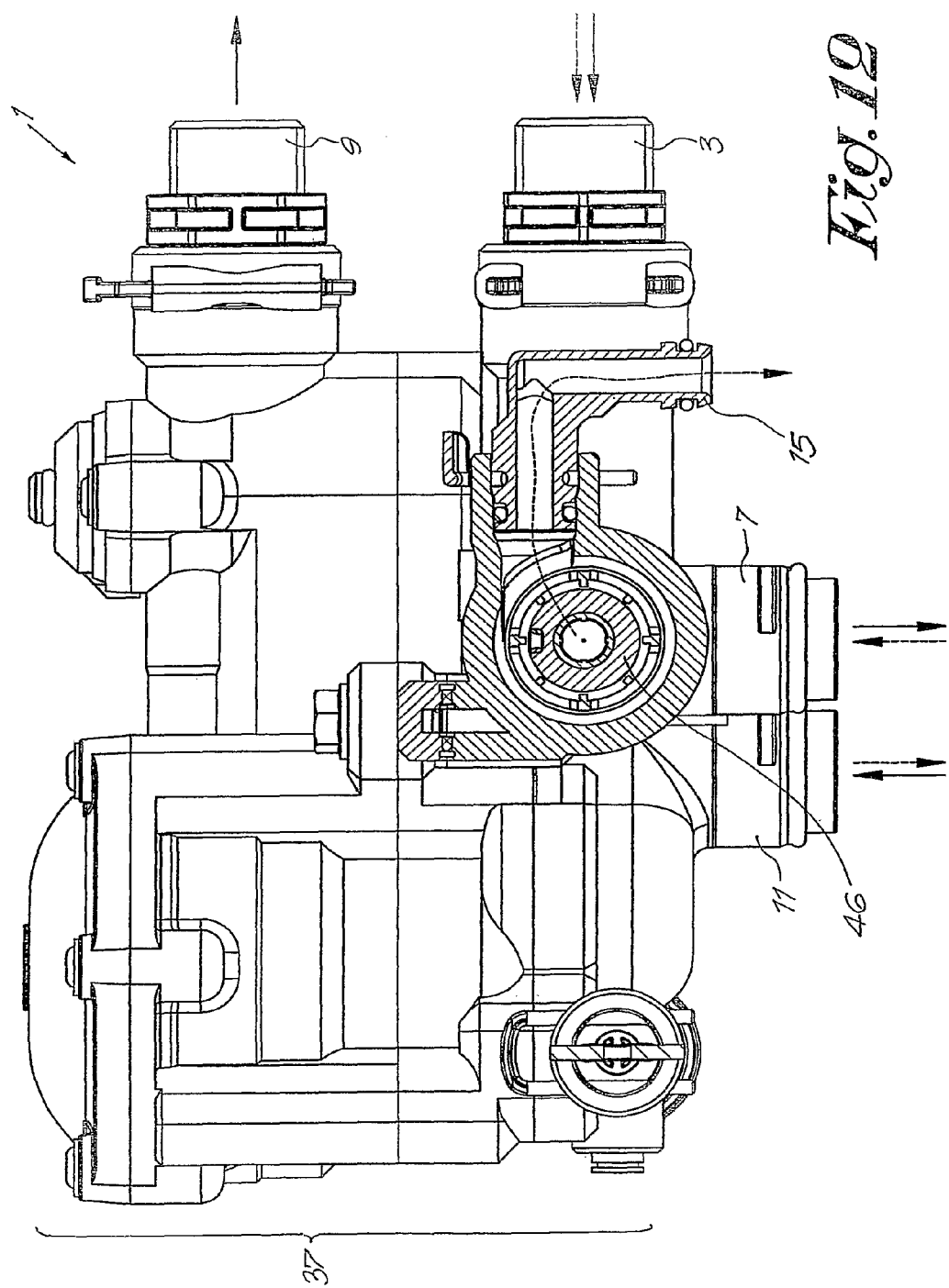

As represented in FIG. 11, the above-mentioned valves 8, 17 and 23 respectively are mechanically coupled in the pipes 6 and 15 and in the bypass 22, whereby the valve 8 is always in a position opposite to that of the valves 17 and 23.

The valve 8 is in this case made in the shape of a non-return valve which is made of a body 46 with a closing side 47 working in conjunction with the pipe 6 where it is branched off from the supply 3.

On the closing side 47 of the valve 8 is in this case provided a rod 48, whereas the rear side 9 of this valve 8 can work in conjunction with a compression spring 50 and with a pressure chamber 51 which is part of the above-mentioned control circuit 27.

Intermediary, between the closing side 47 and the rear side 49, is provided a recess 52 in the body 46 of the valve 8 whose side walls 53 are part of the above-mentioned valve 17 which is provided in the pipe 15 to the sewer drain 16.

Around the intermediary part of the above-mentioned body 46 is provided a sealing ring 54, placed fixed in the housing 38, and which extends from the valve 8 when the latter is opened up to the front of the above-mentioned recess 52, as a result of which the valve 17 is closed.

The valve 23 comprises a closing side 55 which works in conjunction with the bypass 22, there where it branches off from the supply 3.

On the closing side 55 of this valve 23, the free end of the above-mentioned rod 48 is fixed.

Figure 13:
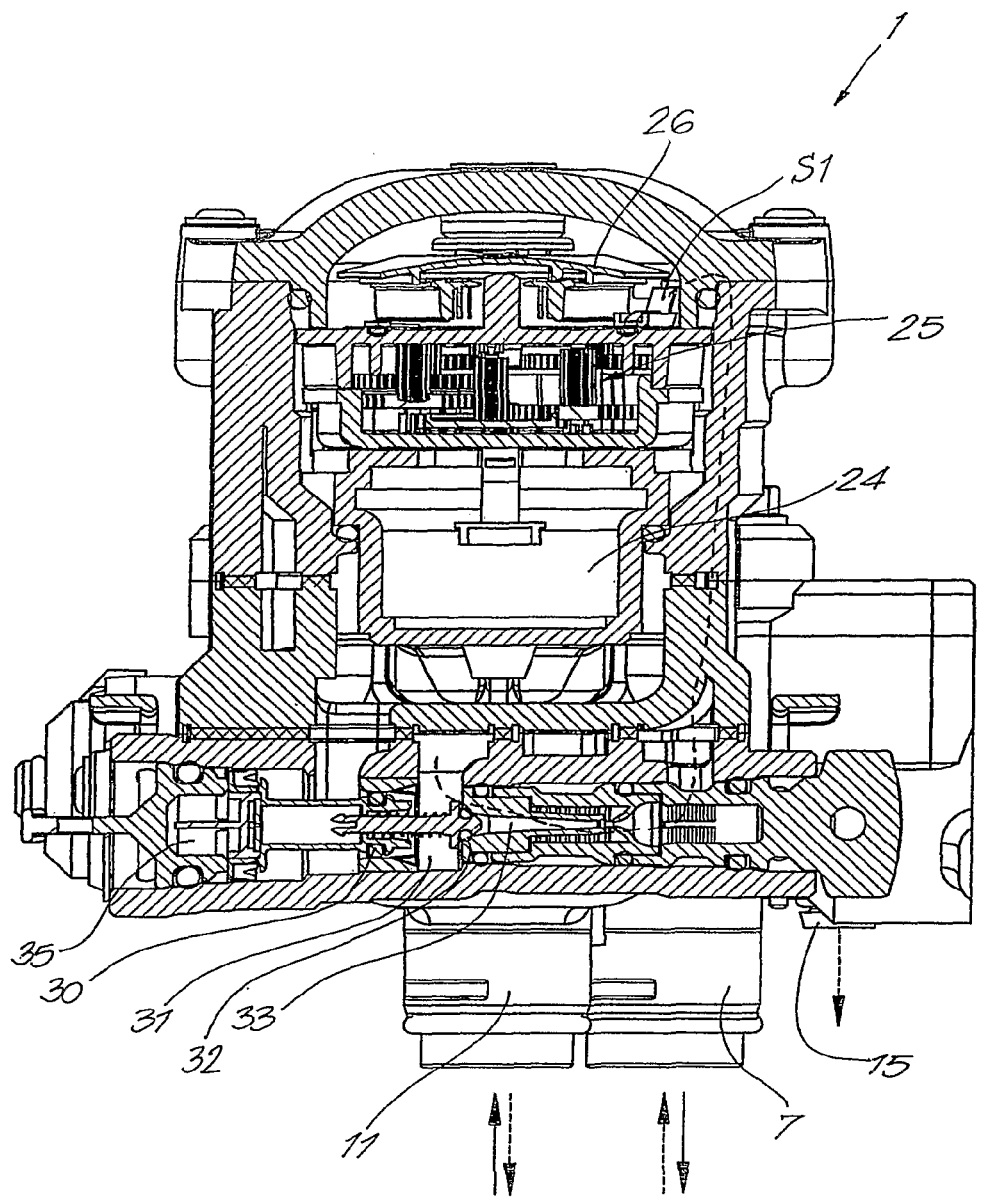

In FIG. 13, the valve 32 is represented as a non-return valve put in a closed position, whereby the water, coming from the treatment tank 4, cannot flow through the ejector 33. Controlling this non-return valve is in this case unnecessary.

It is clear that the non-return valve 32 must be set such that when the valve 30 is opened, this non-return valve 32 remains in a closed position, for example by means of a mechanical stop of the valve.

The working of the above-mentioned mechanically coupled valves 8, 17 and 23 is relatively simple and as follows.

When in the pressure chamber 51, which is part of the control circuit 27, which in this case is a hydraulic circuit, the pressure is built up, the valve 8 is pushed in a closed position, whereby the recess 52 in the body 46 of said valve 8 is shifted in relation to the sealing ring 54, as a result of which the valve 17 is situated in an open position.

When the valve 8 is closed, the rod 48 of the valve 23 is moved in an axial direction, as a result of which the valve 23 is put in an open position.

When the pressure in the pressure chamber 51 is removed, the pressure of the valve 8 on the rod 48 is taken away by means of a small leakage flow through a little channel 56 towards the drain, as a result of which the valve 23 is put in a closed position due to the pressure of the incoming water at the supply 3, and the sealing ring 54 will seal the above-mentioned recess 52 and thus the valve 17.

The present invention is by no means limited to the above-described embodiments represented in the accompanying drawings; on the contrary, such a device for treating water can be made according to different variants while still remaining within the scope of the invention.

The invention claimed is:

1. Device for treating water which comprises a main canalization comprising a supply for water to be treated; a treatment tank which is provided with a treatment medium; a pipe which connects the supply to the inlet of the treatment tank and which is provided with a valve; a drain; a pipe which connects the outlet of the treatment tank to the drain; a regulator; a bypass which is provided with a valve and which connects the supply to the drain; wherein, in the main canalisation are provided a first shut-off valve and a second shut-off valve which are located on either side of the regulator; a first shunt canalisation which bridges the first shut-off valve and the regulator, and a second shunt canalisation which bridges the regulator and the second shut-off valve, wherein the first shunt canalisation and the second shunt canalisation each comprise a shut-off valve, and wherein the first and the second shut-off valve are open during a treatment phase and are closed during a rinse or regeneration phase, whereas the other shut-off valves are open during a rinse or regeneration phase and closed during a treatment phase.

2. Device according to claim 1, wherein the shut-off valves are non-return valves.

3. Device according to claim 1, said main canalization including a pipe which connects the main canalization to a sewage drain, which pipe is provided with a valve.

4. Device according to claim 1, wherein the regulator comprises a volumeter which drives a program disk by means of a transmission.

5. Device according to claim 4, wherein the regulator works in conjunction with a control circuit which enables control of the valves.

6. Device according to claim 5, wherein the position of the valve in the main canalisation is always opposite to the position of the valves in the pipe towards the sewage drain and in the bypass.

7. Device according to claim 6, wherein the valves are mechanically connected to each other.

8. Device according to claim 7, wherein the valve in the main canalisation is a non-return valve which, on a rear side of its body, operates in conjunction with a pressure chamber; said valve in the bypass being provided with a compression spring on its rear side and with a rod on its closing side which operates in conjunction with a closing side of the valve.

9. Device according to claim 8, wherein the valve in the pipe comprises a recess in a body of the valve and of a sealing ring which extends in the main canalisation when the valve is open, over the recess, as a result of which the valve in the pipe is closed.

10. Device according to claim 9, including a third shunt canalisation which bridges the regulator and the second shut-off valve and which is provided with a shut-off valve which enables a flow in the same flow direction as the second shut-off valve.

11. Device according to claim 10, wherein the shut-off valve in the third shunt canalisation is a non-return valve with an adjustable resistance.

12. Device according to claim 1, wherein the regulator and the shut-off valves are situated in the pipe which connects the outlet of the treatment tank to the drain.

13. Device according to claim 1, comprising a brine pipe which bridges the first shunt canalisation and which is provided with a shut-off valve and an ejector which works in conjunction with a brine reservoir.

* * * * *